Sept. 17, 1946.  F. G. MANSON  2,407,715
QUICK-RELEASE CONNECTOR
Filed Oct. 11, 1944  3 Sheets-Sheet 1
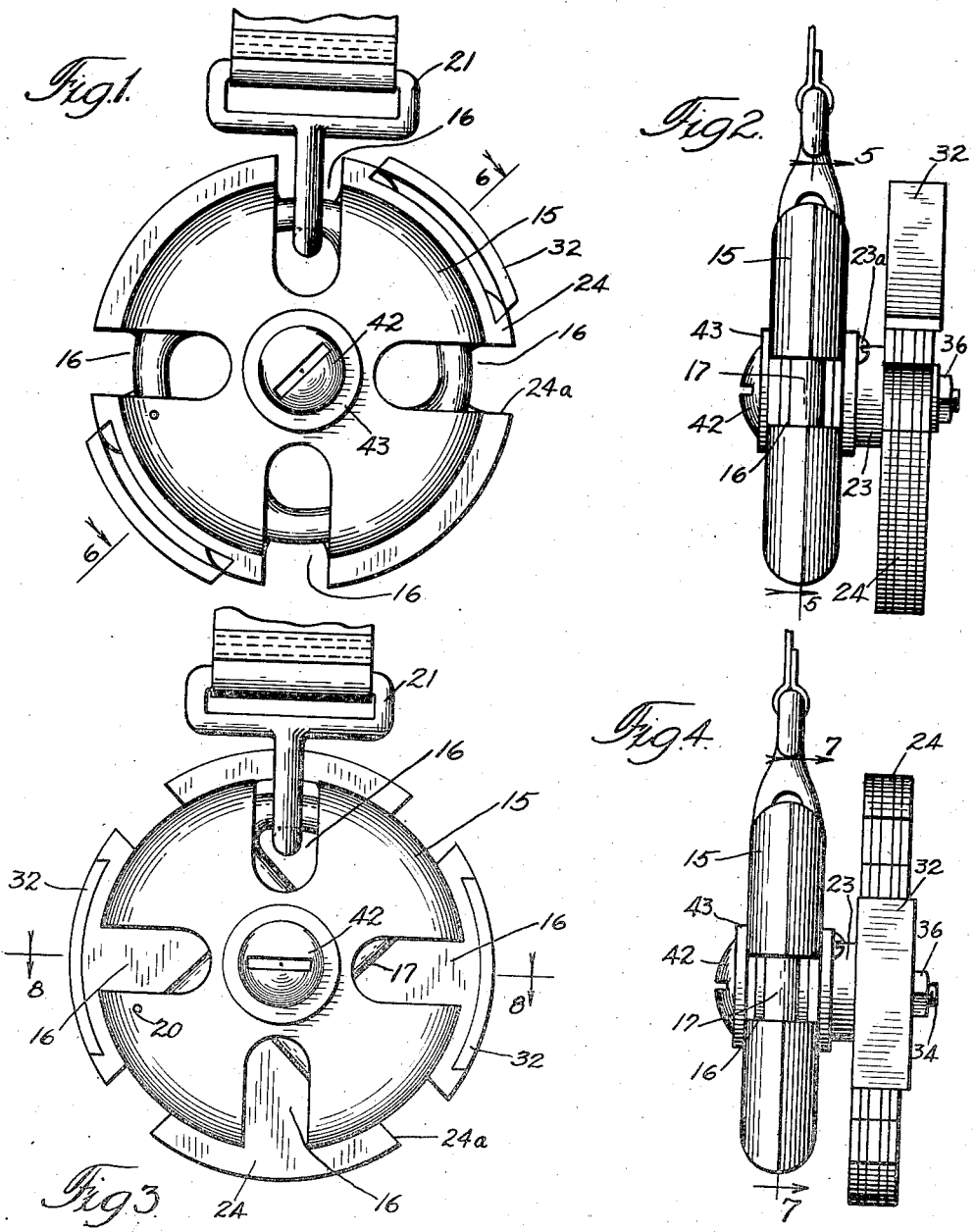
Inventor:
Frank G. Manson.
By: Thiess, Olson & Mecklenburger
Attys.

Sept. 17, 1946.  F. G. MANSON  2,407,715
QUICK-RELEASE CONNECTOR
Filed Oct. 11, 1944  3 Sheets-Sheet 2
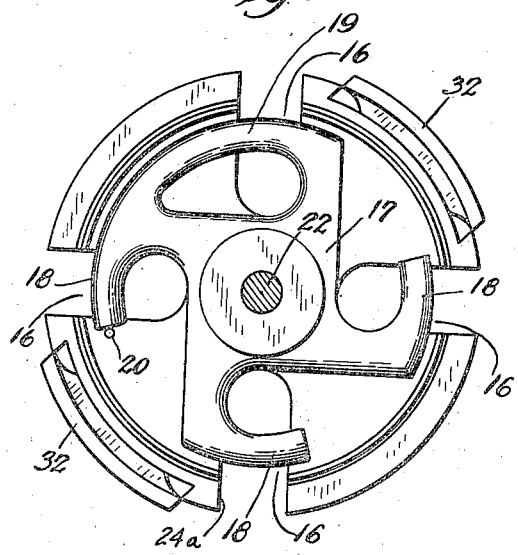
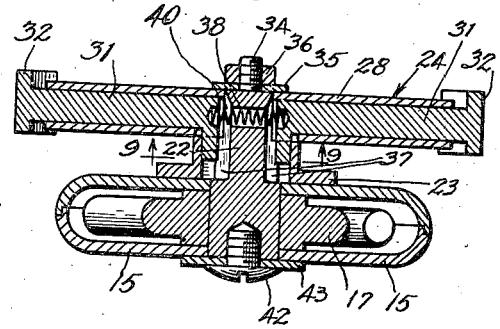
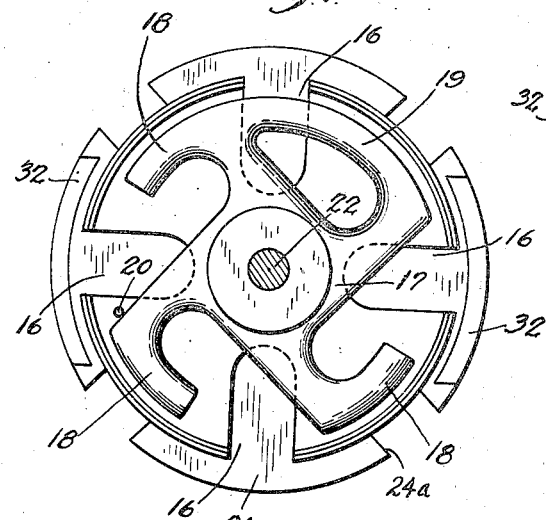
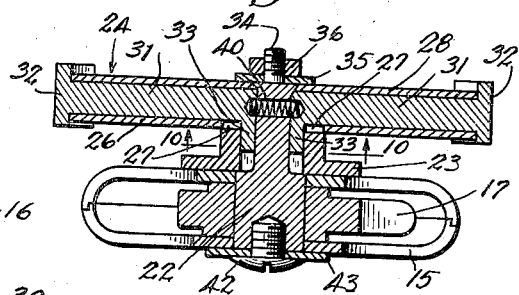
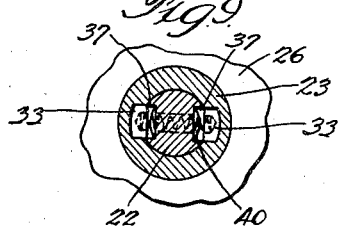
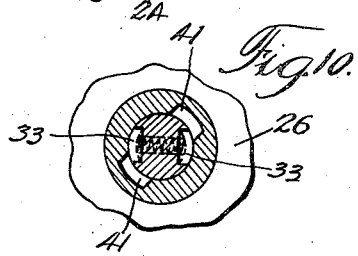
Inventor.
Frank G. Manson.

Sept. 17, 1946.    F. G. MANSON    2,407,715
QUICK-RELEASE CONNECTOR
Filed Oct. 11, 1944    3 Sheets-Sheet 3
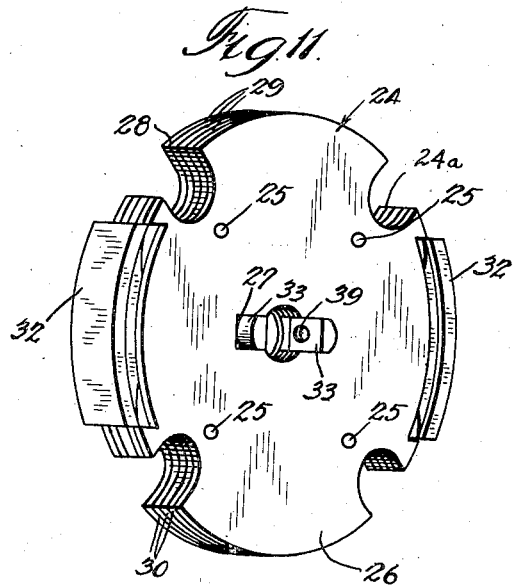
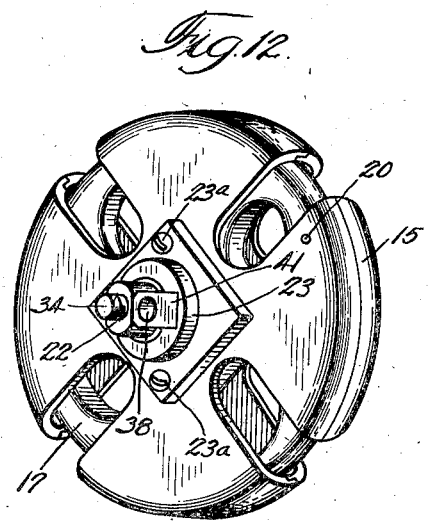
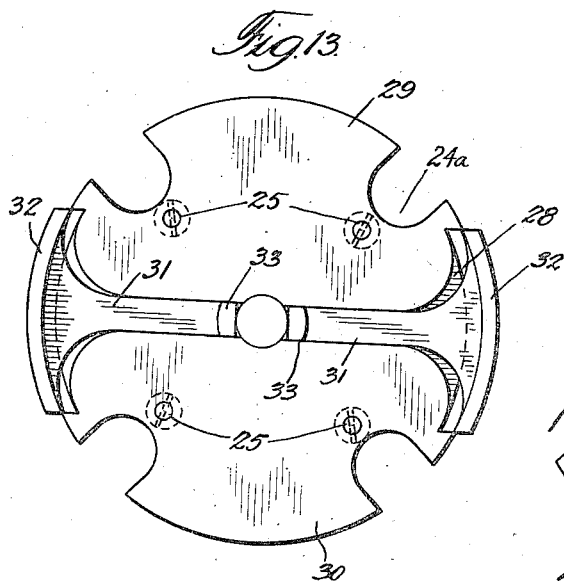
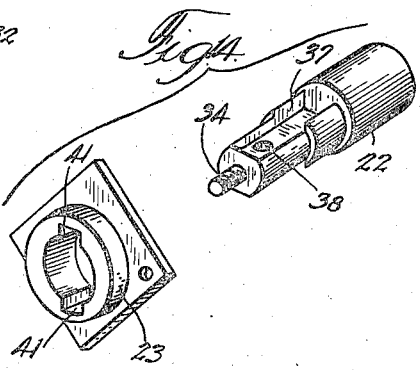

Patented Sept. 17, 1946

2,407,715

UNITED STATES PATENT OFFICE 2,407,715

QUICK-RELEASE CONNECTOR

Frank G. Manson, Chicago, Ill.

Application October 11, 1944, Serial No. 558,264

12 Claims. (Cl. 24—205)

This invention relates to quick-release connectors, more particularly to improved locking and releasing means for connectors of the type having a connector member rotatable between connecting and releasing positions, and the invention has for an object the provision of compact, sturdy and highly reliable devices of this character.

Quick release connectors have heretofore been provided for parachutes and similar harnesses wherein it is desirable to release quickly a plurality of straps. One such connector comprises a hollow casing having a plurality of peripherally spaced slots for co-operation with a rotatably mounted connector member disposed within the casing. The connector member includes a plurality of hooking arms adapted, when in connecting position, to subtend the slots in the casing so that harness hooks or similar fastening means may be engaged thereby, and rotation of the connector member to releasing position causes the hooking arms to move out of the slots thereby to release all of the harness hooks simultaneously. Prior devices of this type have been provided with various latching and locking means for securely holding the connector member in its connecting position to guard against accidental release of the harness and for quickly releasing the connector member for rotation to releasing position. Although certain of such prior devices have attained a high factor of safety while at the same time requiring a relatively simple manipulation for accomplishing quick release, something is yet to be desired in devices of this type and it is a further object of this invention to provide a quick-release connector having an even greater factor of safety and requiring a minimum of skill in manipulation of the releasing mechanism.

In carrying out the invention in one form, a rotatable connector member mounted within a hollow casing for relative rotation between connecting and releasing positions is provided with a shaft extending through a wall of the casing and an operating member or handle mounted on the extending shaft is provided with a pair of transversely movable locking members disposed on opposite sides of the shaft, spring means associated with the locking members tends to urge the locking members radially outward to positions wherein the respective outer ends thereof project beyond opposed gripping surfaces of the operating member. The distance between the opposed projecting ends of the locking members is such that when the operating member is manually gripped in one hand, simultaneous inward pressure on the locking members may be exerted by opposed gripping surfaces of the hand, and locking and releasing means are provided which are effective when either of the locking members is in its projecting position to lock the shaft against rotation relative to the casing, release of the shaft for rotation of the connector member being effected only when both of the locking members are pressed inwardly.

More particularly, the shaft extends through a bearing member carried by the casing and the portion of the shaft within the bearing member is provided with a pair of diametrically disposed axially extending slots. Co-operating slots in the bearing member are disposed for alignment with the slots in the shaft when the connector member is rotated to its connecting position and locking keys extend from the locking members into the slots in the shaft. When the locking members are in their respective projecting positions the locking keys so engage the shaft and bearing slots as to lock the shaft against rotation, and upon inward movement of the locking members the locking keys pass inwardly out of the bearing slots to release the shaft for rotation by the operating member.

For a more complete understanding of the invention, reference should now be had to the drawings in which:

Fig. 1 is an elevational view of a quick-release connector embodying the invention looking at the inner face of the connector, i. e., the face which will be next to the body of the wearer of the parachute harness;

Fig. 2 is a side elevational view of the connector shown in Fig. 1;

Fig. 3 is an elevational view similar to Fig. 1 but showing the connector member rotated to releasing position;

Fig. 4 is a side elevational view similar to Fig. 2 but showing the releasing position of Fig. 3;

Fig. 5 is a sectional view taken along line 5—5 of Fig. 2 showing the connector member in elevation;

Fig. 6 is a sectional view taken along the line 6—6 of Fig. 1;

Fig. 7 is a sectional view similar to Fig. 5 but taken along the line 7—7 of Fig. 4;

Fig. 8 is a sectional view taken along the line 8—8 of Fig. 3;

Figs. 9 and 10 are fragmentary sectional views taken along the lines 9—9 of Fig. 6 and 10—10 of Fig. 8, respectively, Figs. 11 and 12 are perspective views of parts of the quick-release connector in disassembled relation;

Fig. 13 is a detail view of a portion of the operating and locking mechanism with the front plate removed in order more clearly to illustrate the construction; and Fig. 14 is an exploded perspective view showing the shaft and bearing of the connector.

Referring now to the drawings, the invention is shown as embodied in a quick-release connector comprising a hollow disc-shaped casing 15 having four radially extending circumferentially spaced slots 16 for exposing portions of a rotatable connector member 17 which is mounted within the casing. As shown best in Figs. 1, 3, 5, and 7, the connector member 17 is provided with three hooking arms 18 that are open at one side and with a connecting loop 19. A stop pin 20 which extends crosswise of the casing 15 is arranged to be engaged by portions of the connector member 17 so as to limit the connector member to rotation between the connecting position shown in Figs. 1 and 5 and the releasing position shown in Figs. 3 and 7. When in connecting position, each of the hooking arms 18 extends across one of the slots 16 in the casing for engagement by harness hooks or similar fastening means (not shown), and a portion of the loop 19 extends across the other slot 16 for engagement by a suitable buckle or hook 21, as shown in Figs. 1 and 3. As is well understood in devices of this type, when the connector member 17 is rotated to the releasing position shown in Figs. 3 and 7, the hooking arms 18 move out of their associated slots so that all of the harness hooks or fastening means will immediately and simultaneously be released.

The connector member 17 is mounted on a rotatable shaft 22 which extends through a wall of the casing 15 and through a member 23 which is secured to the outer wall of the casing by suitable screws 23a (Fig. 12) and forms a bearing for the shaft. The shaft 22, as shown best in Fig. 12, extends through and beyond the bearing member 23 and a disc-shaped operating member or handle 24 (Fig. 11) is provided adapted to engage the projecting end of the shaft 22.

Although the operating member 24 may be formed in any desirable manner, it is shown as being made up of a plurality of laminations secured together by suitable screws 25. The inner lamination 26, which rests against the outer surface of the bearing member 23 when the device is assembled, is provided with a central aperture through which the shaft projects and with suitable diametrically disposed slots 27 which extend radially from the central aperture for a purpose which will be more fully described hereinafter.

The outer lamination 28 of the disc-shaped handle member is similar in configuration to the inner lamination 26 except that it is not provided with slots corresponding to the slots 27. In between the laminations 26 and 28 are disposed two sets of laminations 29 and 30 which are shaped as shown in Fig. 13 and spaced apart on opposite sides of a diametric line extending through the slots 27 of the inner lamination. In Fig. 13 the inner lamination 26 is removed in order more clearly to show the shape of the laminations 29 and 30. Although three laminations are shown in each of the groups 29 and 30, it will of course be understood that any desired number may be employed and that the laminations may be made of any suitable thickness.

Due to the fact that the laminations 29 and 30 are spaced apart, diametrically disposed radially extending slots are formed in the disc-shaped operating member 24 and T-shaped locking members 31 are disposed in these slots for radial movement therein. Each of the locking members 31 is provided with an arcuately shaped head 32 and the periphery of the operating disc 24 is provided with circumferential notches 24a for receiving the arcuate heads 32 when the locking members are pressed inwardly each of the notches 24a, as shown, subtending a substantial angle at the periphery of the disc 24.

The diameter of the operating disc 24 is such that it may readily be grasped in the hand of an operator and the arcuate heads 32 on the locking member 31 project slightly beyond the periphery of the disc so that they may be grasped between opposed surfaces of the operator's hand and be simultaneously pressed inwardly. The arcuate heads 32 extend about a substantial portion of the periphery of the disc 24 to insure that the operator will not have to waste time feeling or looking for them when it is desired to rotate the disc for quick release.

Each of the locking members 31 is provided at its inner end with an angularly extending locking key 33, and as will be observed from Fig. 11 these locking keys 33 extend through the slots 27 in the inner lamination 26, the length of the slots being such as to permit inward and outward radial movement of the locking members 31.

The shaft 22 is provided with a reduced end portion 34 which extends beyond the operating disc 24 and is provided with screw threads to receive a suitable washer 35 and a nut 36 (Fig. 6) for holding the operating member 24 on the shaft with the inner lamination 26 engaging the bearing member 23. In order to key the operating disc 24 to the shaft 22 so that rotation of the operating disc will effect rotation of the connector member 17, the shaft 22 is provided with diametrically disposed axially extending slots 37. When the operating disc 24 is mounted on the shaft the locking keys 33 project into the slots 37 in the shaft and key the operating disc to the shaft.

As shown best in Figs. 6, 8 and 12, the shaft 22 is provided with a transverse bore or aperture 38 and the inner end of each of the locking members 31 is provided with a recess 39. A coil spring 40 is disposed in the aperture 38 with its opposite ends projecting into the recesses 39 in the locking members 31. Thus the spring 40 is effective at all times to urge the locking members radially outward toward the projecting positions shown particularly in Figs. 5 and 6.

In order effectively to lock the operating disc 24 in a position corresponding to the connecting position of the connector member 17 the bearing member 23 is provided with axially extending diametrically disposed slots 41 which are arranged for alignment with the slots 37 in the shaft 22 when the connector member 27 and the shaft 22 are rotated to the connecting position shown in Figs. 5 and 6. With the slots 37 and 41 in alignment, the spring 40 moves the locking members 31 outwardly and the locking keys 33 enter the slots 41 in the bearing member 23 thereby to prevent rotation of the connector member by the disc 24. When the disc 24 is grasped and the two locking members 31 are forced inwardly by exerting pressure on the arcuate heads 32, the locking keys 33 move to a position in which the locking keys are disposed entirely within the slots 37 in the shaft 22. In other words, the locking keys 33 move out of the slots 41 and consequently the shaft 22 is freed for rotation of the connector member 27 to the releasing position shown in Figs. 7, 8, and 10.

It will be observed that the locking members are disposed on opposite sides of the shaft 22 for movement in opposed directions and consequently shocks and jars imparted to the harness or the connector, regardless of the direction and magnitude of the forces, cannot effect accidental movement of both locking members to unlocking position. Furthermore, the chances of direct accidental blows effecting movement of both locking members are reduced to an absolute minimum. Unless both of the locking members 31 are in their respective inner positions, the connector member will not be released for rotation and thus an extremely high factor of safety is obtained.

In order to operate the connector member to releasing position, it is necessary only to grasp the operating disc 24 in the palm and fingers of the hand so as to press inwardly on the opposed arcuate heads 32, and then rotate the disc to the position shown in Figs. 3, 4 and 7. To again lock the connector member 17 it is only necessary to rotate the disc 24 until the connector member 17 reaches the connecting position shown in Figs. 1, 2 and 5, whereupon the spring 40 automatically returns the locking members 31 to their projecting locking positions due to the fact that the locking keys 33 in the slots 37 are brought into alignment with and can move outwardly into the slots 41 in the bearing member 23.

In order to maintain the quick-release connector in assembled relation, the end of the shaft 22 opposite from the reduced threaded portion 34 is tapped to receive a screw 42, and washer 43 (Figs. 6 and 8) is preferably provided for engaging a wall of the casing 15. The casing 15, as shown best in Fig. 6, is preferably formed in two halves, one half being secured to the shaft 22 by means of the screw 42 and the washer 43 and the other half of the casing 15, which carries the bearing member 23, being held in position by securement of the operating disc 24 to the opposite end of the shaft 22.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a quick-release connector of the type having a hollow casing and a connector member therein rotatable relative to said casing between connecting and releasing positions, the combination of a shaft for said connector member extending through a wall of said casing, an operating member on said shaft extending transversely thereof, a pair of transversely movable locking members carried by said operating member and disposed on opposite sides of said shaft in diametric relation, spring means urging said locking members radially outward to positions wherein the respective outer ends of said locking members project beyond opposed gripping surfaces of said operating member, the distance between said projecting ends being such as to permit simultaneous inward pressure thereon by opposed gripping surfaces of a human hand when said operating member is gripped for manual rotation, means effective when either of said locking members is in its projecting position to lock said shaft against rotation relative to said casing, said means being rendered ineffective upon inward movement of both of said locking members to predetermined inner positions thereby to permit rotation of said shaft and connector member relative to said casing.

2. In a quick-release connector of the type having a hollow casing and a connector member therein rotatable relative to said casing between connecting and releasing positions, the combination of a shaft for said connector member extending through a wall of said casing, a disc-like operating member on said shaft having a pair of slots extending radially on opposite sides of said shaft in diametric relation, a locking member disposed for radial movement in each of said slots, spring means urging said locking members radially outwardly to positions wherein the respective outer ends project beyond the periphery of said disc-like member, the distance between said projecting ends being such as to permit simultaneous inward pressure thereon by opposed gripping surfaces of a human hand when the periphery of said disc-like member is gripped for manual rotation, and means effective when either of said locking members is in its outer projecting position to lock said shaft against rotation relative to said casing, said means being rendered ineffective only upon movement of both of said locking members to predetermined inner positions, whereby rotation of said shaft and said connector member relative to said casing is permitted.

3. In a quick-release connector of the type having a hollow casing and a connector member therein rotatable relative to said casing between connecting and releasing positions, the combination of a shaft for said connector member extending through a wall of said casing, an operating member on said shaft extending transversely thereof, a pair of transversely movable locking members carried by said operating member and disposed on opposite sides of said shaft in diametric relation, spring means urging said locking members radially outward to positions wherein the respective outer ends of said locking members project beyond opposed gripping surfaces of said operating member, the distance between said projecting ends being such as to permit simultaneous inward pressure thereon by opposed gripping surfaces of a human hand when said operating member is gripped for manual rotation, means for preventing movement of said locking members to said projecting positions except when said connector member is in said connecting position, and means effective when either of said locking members is in its outer projecting position to lock said shaft against rotation relative to said casing, said locking means being rendered ineffective only upon movement of both of said locking members to predetermined inner positions, whereby rotation of said shaft and said connector member to said releasing position is permitted.

4. In a quick-release connector of the type having a hollow casing and a connector member therein rotatable relative to said casing between connecting and releasing positions, the combination of a shaft for said connector member extending through a wall of said casing, a disc-like operating member on said shaft having a pair of slots extending radially on opposite sides of said shaft in diametric relation, a locking member disposed for radial movement in each of said slots, spring means urging said locking members radially outwardly to positions wherein the respective outer ends project beyond the periphery of said disc-like member, the distance between said projecting ends being such as to permit simultaneous inward pressure thereon by opposed gripping surfaces of a human hand when the periphery of said disc-like member is gripped for manual rotation, means for preventing movement of said locking members to said projecting positions except when said connector member is in said connecting position, and means effective when either of said locking members is in its outer projecting position to lock said shaft against rotation relative to said casing, said locking means being rendered ineffective only upon movement of both of said locking members to predetermined inner positions, whereby rotation of said shaft and said connector member to said releasing position is permitted.

5. In a quick-release connector of the type having a hollow casing and a connector member therein rotatable relative to said casing between connecting and releasing positions, the combination of a shaft for said connector member extending through a wall of said casing, an operating disc on said shaft having a pair of slots extending radially on opposite sides of said shaft in diametric relation, each of said slots terminating in a circumferential notch subtending a substantial angle at the periphery of said disc, a substantially T-shaped locking member disposed for radial movement in each of said slots, the head of each T-shaped locking member being arcuate and adapted to lie in one of said circumferential notches when said locking member is in an inner position, spring means urging said locking members radially outward to positions wherein said arcuate heads project beyond the periphery of said disc, the distance between said heads when in said projecting positions being such as to permit simultaneous inward pressure thereon by opposed gripping surfaces of a human hand when the periphery of said disc is gripped for manual rotation, means for preventing outward movement of said locking members to said projecting positions except when said connector member is in said connecting position, and means effective when either of said locking members is in its outer projecting position to lock said shaft against rotation relative to said casing, said locking means being rendered ineffective only when both of said locking members are in said inner positions, whereby rotation of said shaft and said connector member to said releasing position may be effected by said disc.

6. In a quick-release connector of the type having a hollow casing and a rotatable connector member therein, the combination of a shaft for said member extending through a wall of said casing, an annular member surrounding a portion of said shaft and secured to said casing, the adjacent surfaces of said shaft and said annular member having axial slots therein disposed for radial alignment when said connector member is in its connecting position, an operating member on said shaft, a locking member carried by said operating member radially movable between inner and outer positions, said locking member including a locking key extending into said aligned slots when said locking member is in its outer position to lock said shaft against rotation relative to said annular member thereby to retain said connector member in connecting position, said locking key upon radial movement of said locking member passing out of said slot in said annular member to free said shaft from said annular member thereby to permit rotation of said connector member to releasing position by said operating member, and spring means for operating said locking member to said outer position upon rotation of said connector member to said connecting position.

7. In a quick-release connector of the type having a hollow casing and a rotatable connector member therein, the combination of a shaft for said member extending through a wall of said casing, an annular member surrounding a portion of said shaft and secured to said casing, the adjacent surfaces of said shaft and said annular member having axial slots therein disposed for radial alignment when said connector member is in its connecting position, an operating member loosely mounted on said shaft, a locking member carried by said operating member radially movable between inner and outer positions, said locking member including a locking key extending into said slot in said shaft to key said shaft to said operating member for rotation thereby, said locking key being movable partially into said slot in said annular member by movement of said locking member to said outer position when said slots are in alignment to lock said shaft against rotation, said locking key upon radial movement of said locking member passing out of said slot in said annular member to free said shaft for rotation by said operating member whereby said connector member is rotated to releasing position, and spring means resiliently urging said locking member toward said outer position.

8. In a quick-release connector of the type having a hollow casing and a rotatable connector member therein, the combination of a shaft for said member extending through a wall of said casing, an annular member surrounding a portion of said shaft and secured to said casing, the adjacent surfaces of said shaft and said annular member having axial slots therein disposed for radial alignment when said connector member is in its connecting position, an operating disc on said shaft having a radially extending slot therein, a locking member radially movable in said slot in said disc between an inner and an outer position, the outer end of said locking member being of arcuate shape and adapted to project beyond the periphery of said disc when said locking member is in said outer position, said disc having a notch in the periphery thereof for receiving said arcuate end of said locking member upon movement to said inner position, said locking member including a locking key extending into said aligned slots when said locking member is in said outer position to lock said shaft against rotation relative to said annular member thereby to retain said connector member in connecting position, said locking key upon movement of said locking member to said inner position passing out of said slot in said annular member to free said shaft from said annular member and permit rotation of said connector member to releasing position by said operating disc, and spring means for operating said locking member to said outer position upon rotation of said connector member to connecting position.

9. In a quick-release connector of the type having a hollow casing and a rotatable connector member therein, the combination of a shaft for said member extending through a wall of said casing, an annular member surrounding a portion of said shaft and secured to said casing, the adjacent surfaces of said shaft and said annular member having axial slots therein disposed for radial alignment when said connector member is in its connecting position, an operating disc loosely mounted on said shaft and having a radially extending slot therein, a locking member radially movable in said slot in said disc, the outer end of said locking member being of arcuate shape and adapted to extend beyond the periphery of said disc when said locking member is in its outer position, said disc having a notch in the periphery thereof for receiving said arcuate end upon movement of said locking member to its inner position, said locking member including a locking key extending into said slot in said shaft to key said shaft to said disc for rotation thereby, said locking key being movable partially into said slot in said annular member by movement of said locking member to said outer position thereby to lock said shaft against rotation when said axial slots are in alignment, and spring means resiliently urging said locking member toward said outer position, said locking member upon movement to said inner position moving said locking key out of said slot in said annular member to free said shaft for rotation by said disc whereby said connector member is rotated to releasing position.

10. In a quick-release connector of the type having a hollow casing and a rotatable connector member therein, the combination of a shaft extending through a wall of said casing, a bearing for said shaft secured to said wall, said shaft having an axially extending slot therein, an operating member on said shaft, a locking member carried by said operating member movable radially of said shaft, said locking member including a locking key extending into said slot to key said shaft to said operating member for rotation of said connector member, said bearing having an axially extending slot in the inner surface thereof in radial alignment with said slot in said shaft when said connector member is in connecting position, and spring means for resiliently urging said locking member radially outward from said shaft, said locking member upon outward movement when said slots are in alignment moving a portion of said locking key into said slot in said bearing to lock said shaft and said connector member in connecting position, said locking key upon inward movement of said locking member moving out of said slot in said bearing to free said shaft and connector member for rotation to releasing position.

11. In a quick-release connector of the type having a hollow casing and a rotatable connector member therein, the combination of a shaft for said member extending through a wall of said casing, a bearing member surrounding a portion of said shaft and secured to said casing, the adjacent surfaces of said shaft and said bearing member having axial slots therein disposed for radial alignment when said connector member is in its connecting position, an operating disc mounted on said shaft beyond said bearing member and having a radially extending slot therein, a locking member radially movable in said slot in said disc and having an arcuate outer end, said disc having a peripheral notch for receiving said arcuate end when said locking member is in its inner position, spring means urging said locking member to an outer position wherein said arcuate end projects outwardly from the periphery of said disc, said locking member including a locking key extending into said slot to key said shaft to said disc for rotation of said connector member, said bearing member having an axially extending slot in the inner surface thereof in radial alignment with said slot in said shaft when said connector member is in connecting position, said spring means upon alignment of said axially extending slots moving said locking member to said outer position to move a portion of said locking key into said slot in said bearing member and thereby lock said shaft and connector member in said connecting position, said locking key when said locking member is pressed inwardly moving out of said slot in said bearing member to free said shaft and connector member for rotation by said disc to a releasing position.

12. In a quick-release connector of the type having a hollow casing and a rotatable connector therein, the combination of a shaft for said rotatable member extending through a wall of said casing, a bearing for said shaft secured to said wall, said shaft having a pair of diametrically disposed axially extending slots in the surface thereof, an operating member on said shaft extending transversely thereof and having diametrically disposed slots therein extending radially from said shaft, a pair of locking members respectively disposed in said radial slots on opposite sides of said shaft for inward and outward radial movement, spring means urging said locking members to outer positions wherein the outer ends thereof project beyond said operating member, each of said locking members including a locking key extending into the adjacent axial slot in said shaft to key said shaft to said operating member for rotation of said connector member between connecting and releasing positions, said bearing having diametrically disposed axial slots in the inner surface thereof in radial alignment with said slots in said shaft when said connector member is in connecting position, said spring means upon alignment of said slots in said shaft and said bearing moving said locking members to said outer positions thereby to move a portion of each locking key into the adjacent bearing slot and lock said shaft and connector member against rotation, said locking members being movable inwardly by pressure against said projecting outer ends to move said locking keys out of the respective bearing slots and free said shaft for rotation of said connector member to said releasing position.

FRANK G. MANSON.